US010489221B2

(12) United States Patent
Zhao et al.

(10) Patent No.: US 10,489,221 B2
(45) Date of Patent: Nov. 26, 2019

(54) METHOD FOR CREATING CONTEXT AWARE APPLICATION AND USER TERMINAL

(71) Applicant: Huawei Technologies Co., Ltd., Shenzhen (CN)

(72) Inventors: Qingwei Zhao, Shenzhen (CN); Heng Chang, Shenzhen (CN); Qifeng Ma, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 165 days.

(21) Appl. No.: 15/439,718

(22) Filed: Feb. 22, 2017

(65) Prior Publication Data
US 2017/0161123 A1    Jun. 8, 2017

Related U.S. Application Data

(63) Continuation of application No. PCT/CN2015/086270, filed on Aug. 6, 2015.

(30) Foreign Application Priority Data

Aug. 22, 2014    (CN) .......................... 2014 1 0418503

(51) Int. Cl.
*G06F 9/46*    (2006.01)
*G06F 9/54*    (2006.01)
(Continued)

(52) U.S. Cl.
CPC ............... *G06F 9/542* (2013.01); *G06F 8/34* (2013.01); *G06F 8/36* (2013.01); *G06F 9/44* (2013.01);
(Continued)

(58) Field of Classification Search
CPC .................. G06F 9/542; G06F 9/546
(Continued)

(56) References Cited

U.S. PATENT DOCUMENTS 8,150,952 B2    4/2012 Masuda
8,812,577 B2    8/2014 Song et al.
(Continued)

FOREIGN PATENT DOCUMENTS

CN        101002175 A    7/2007
CN        101315632 A    12/2008
(Continued)

OTHER PUBLICATIONS

Rui et al. "A Survey of Context-Aware Computing and Its System Infrastructure," pp. 269-276, Journal of Computer Research and Development (2007).
(Continued)

*Primary Examiner* — Andy Ho
(74) *Attorney, Agent, or Firm* — Leydig, Voit & Mayer, Ltd.

(57) ABSTRACT

A method for creating a context aware application and a user terminal are provided, where the method includes: obtaining a creation instruction used to create the context aware application, where the creation instruction includes a creation factor, and the creation factor is entered by a user and/or generated by a user terminal; determining, according to the creation factor, at least one terminal device related to the creation factor, and obtaining context information and action information of the at least one terminal device; generating at least one operation item according to the context information and the action information of the at least one terminal device; and generating the context aware application according to the at least one operation item. Thereby resolving a technical problem that development
(Continued)

steps of the context aware application are tedious, and achieving beneficial effects of simplifying the development steps and improving the development efficiency.

20 Claims, 7 Drawing Sheets

(51) Int. Cl.
   *G06F 9/44* (2018.01)
   *G06F 8/34* (2018.01)
   *G06F 8/36* (2018.01)
   *G06F 11/30* (2006.01)
   *G06F 11/34* (2006.01)

(52) U.S. Cl.
   CPC ........ *G06F 11/302* (2013.01); *G06F 11/3055* (2013.01); *G06F 11/3438* (2013.01)

(58) Field of Classification Search
   USPC .................................................. 719/313, 318
   See application file for complete search history.

(56) References Cited

U.S. PATENT DOCUMENTS

| | | | |
|---|---|---|---|
| 9,363,336 B2* | 6/2016 | Lawson | G05B 19/4185 |
| 10,084,783 B2* | 9/2018 | Dubman | H04L 63/10 |
| 2006/0005156 A1 | 1/2006 | Korpipaa et al. | |
| 2008/0244526 A1 | 10/2008 | Chang et al. | |
| 2010/0010953 A1 | 1/2010 | Meliksetian et al. | |
| 2015/0227118 A1* | 8/2015 | Wong | G05B 15/02 700/44 |

FOREIGN PATENT DOCUMENTS

| | | |
|---|---|---|
| CN | 101625738 A | 1/2010 |
| CN | 102436371 A | 5/2012 |
| CN | 103313108 A | 9/2013 |
| CN | 103699366 A | 4/2014 |
| CN | 104182232 A | 12/2014 |
| EP | 2584756 A1 | 4/2013 |

OTHER PUBLICATIONS

Xu et al., "Dynamic and self-adaptive middleware infrastructure for supporting context-aware applications," pp. 1149-1154, Journal of Computer Applications (2014).

Zhang et al., "Context-aware Commodity Recommendation Information Service in E-Commerce," 2012 Sixth International Conference on Internet Computing for Science and Engineering, pp. 20-25, International Electrical and Electronics Engineering, New York, New York (2012).

Xia et al., "Context-Aware Image Annotation and Retrieval on Mobile Device," 2010 Second International Conference on MultiMedia and Information Technology, pp. 111-114, International Electrical and Electronics Engineering, New York, New York (2010).

Wang, "Research on Intelligent Home Based on Situation-Sensing Technology," (Jan. 1, 2008).

* cited by examiner

| Element | Graphical element |
|---|---|
| Context and action | Time  Open door |
| Attribute, operator, and attribute value expression | temperature = 26 |
| Logical operator AND | And |
| Logical operator OR | Or |

FIG. 7

METHOD FOR CREATING CONTEXT AWARE APPLICATION AND USER TERMINAL

CROSS-REFERENCE TO RELATED APPLICATIONS

This application is a continuation of International Application No. PCT/CN2015/086270, filed on Aug. 6, 2015, which claims priority to Chinese Patent Application No. 201410418503.0, filed on Aug. 22, 2014. The disclosures of the aforementioned applications are hereby incorporated by reference in their entireties.

TECHNICAL FIELD

The present disclosure relates to the field of electronic technologies, and in particular, to a method for creating a context aware application and a user terminal.

BACKGROUND

With the rapid development and popularization of a context aware technology, and particularly, the development of the Internet of Things and an intelligent space technology, a context aware application based on Internet information and sensor information of the Internet of Things is increasingly integrated into daily lives of ordinary people. Therefore, for a common user with no professional development skill, a requirement for creating a personalized context aware application of a trigger type is also increasingly strong.

Currently, a context aware application is constructed mainly based on a trigger rule, that is, a specified action is triggered when a condition constituted of a context is met. For example, for an application rule "turning on a light in the living room when arriving home", "arriving home" is a condition constituted of user location information, and "turning on a light in the living room" is an action executed to respond to the condition "arriving home".

In the prior art, when a user develops a context aware application, the user selects a required operation item by using a development tool and then constructs a scenario according to required logic, where the operation item includes an identifier representing the application and an operation manner representing an execution action. Therefore, the user needs to subjectively select all contexts and actions that are used in the scenario when the context aware application is constructed, which reduces development efficiency.

It can be learned that a technical problem that development steps of the context aware application are tedious and the development efficiency is low exists in the prior art.

SUMMARY

Embodiments of the present disclosure provide a method for creating a context aware application and a user terminal, so as to resolve a technical problem in the prior art that development steps of a context aware application are tedious and development efficiency is low.

According to a first aspect, the present disclosure provides a method for creating a context aware application, where the method includes:

obtaining a creation instruction used to create the context aware application, where the creation instruction includes a creation factor, and the creation factor is entered by a user and/or generated by a user terminal;

determining, according to the creation factor, at least one terminal device related to the creation factor, and obtaining context information and action information of the at least one terminal device;

generating at least one operation item according to the context information and the action information of the at least one terminal device; and generating the context aware application according to the at least one operation item.

With reference to the first aspect, in a first possible implementation manner, the context information and the action information are specifically: information historically recorded or instantly generated.

With reference to the first possible implementation manner, in a second possible implementation manner, when the context information and the action information are stored on the at least one terminal device, the obtaining context information and action information of the at least one terminal device specifically includes:

sending a request message to the at least one terminal device; and receiving a response message returned by the at least one terminal device, and obtaining the historically recorded context information and action information that are stored on the at least one terminal device and that are carried in the response message.

With reference to the first aspect, the first possible implementation manner, or the second possible implementation manner, in a third possible implementation manner, the determining, according to the creation factor, at least one terminal device related to the creation factor specifically includes:

when the creation factor is specifically a context aware application type, determining the at least one terminal device included in the context aware application type; or when the creation factor is specifically a terminal device identifier entered by the user, determining the at least one terminal device related to the identifier; or when the creation factor is specifically area location information entered by the user or generated by the user terminal, determining the at least one terminal device within an area corresponding to the area location information; or when the creation factor is specifically time information generated by the user terminal, determining, based on the time information, the at least one terminal device operated within a preset time interval; or when the creation factor is specifically a start node and an end node on which the user terminal records the context aware application, determining the at least one terminal device between the start node and the end node.

With reference to the first aspect or any one of the first to the third possible implementation manners, in a fourth possible implementation manner, when there are at least two pieces of context information, after the obtaining context information and action information of the at least one terminal device, the method further includes:

obtaining, by screening according to a time parameter in each piece of context information, at least two pieces of context information whose time parameter difference is within a preset threshold and at least two pieces of action information corresponding to the at least two pieces of context information; or obtaining, by screening according to a time parameter in each piece of context information, at least one piece of context information whose time parameter belongs to a set time interval and at least one piece of action information corresponding to the at least one piece of context information; or obtaining, by screening according to location information in each piece of context information, at least one piece of context information corresponding to location information whose location is within a set location area and at least one piece of action information corresponding to the at least one piece of context information.

With reference to the first aspect or any one of the first to the fourth possible implementation manners, in a fifth possible implementation manner, the generating at least one operation item according to the context information and the action information of the at least one terminal device specifically includes:

generating at least one condition operation item according to the context information, and generating at least one action operation item according to the action information; and after the generating at least one operation item according to the context information and the action information of the at least one terminal device, the method further includes:

determining, according to the action information, an order in which the at least one terminal device is historically operated, sorting, according to the order, an identifier representing the at least one terminal device, and associating the sorted identifier of the at least one terminal device with a corresponding condition operation item and action operation item.

With reference to the fifth possible implementation manner, in a sixth possible implementation manner, the at least one condition operation item includes a condition operation item whose condition parameter value is adjustable; the at least one action operation item includes an action operation item whose action parameter value is adjustable.

With reference to the first aspect or any one of the first to the sixth possible implementation manners, in a seventh possible implementation manner, the context information includes at least one of the following: a terminal device identifier, a time parameter, context parameter data, a device home type, or location information.

With reference to the first aspect or any one of the first to the seventh possible implementation manners, in an eighth possible implementation manner, the action information includes at least one of the following: an action name, execution time, execution parameter data, or an execution result.

According to a second aspect, the present disclosure provides a user terminal, where the user terminal includes:

an instruction obtaining unit, configured to obtain a creation instruction used to create a context aware application, where the creation instruction includes a creation factor, and the creation factor is entered by a user and/or generated by the user terminal;

an information obtaining unit, configured to: determine, according to the creation factor, at least one terminal device related to the creation factor, and obtain context information and action information of the at least one terminal device;

an operation item generating unit, configured to generate at least one operation item according to the context information and the action information of the at least one terminal device; and an application generating unit, configured to generate the context aware application according to the at least one operation item.

With reference to the second aspect, in a first possible implementation manner, the context information and the action information are specifically: information historically recorded or instantly generated.

With reference to the first possible implementation manner, in a second possible implementation manner, when the context information and the action information are stored on the at least one terminal device, the information obtaining unit is specifically configured to:

send a request message to the at least one terminal device; and receive a response message returned by the at least one terminal device, and obtain the historically recorded context information and action information that are stored on the at least one terminal device and that are carried in the response message.

With reference to the second aspect, the first possible implementation manner, or the second possible implementation manner, in a third possible implementation manner, the information obtaining unit is further configured to:

when the creation factor is specifically a context aware application type, determine the at least one terminal device included in the context aware application type; or when the creation factor is specifically a terminal device identifier entered by the user, determine the at least one terminal device related to the identifier; or when the creation factor is specifically area location information entered by the user or generated by the user terminal, determine the at least one terminal device within an area corresponding to the area location information; or when the creation factor is specifically time information generated by the user terminal, determine, based on the time information, the at least one terminal device operated within a preset time interval; or when the creation factor is specifically a start node and an end node on which the user terminal records the context aware application, determine the at least one terminal device between the start node and the end node.

With reference to the second aspect or any one of the first to the third possible implementation manners, in a fourth possible implementation manner, when there are at least two pieces of context information, the user terminal further includes an information screening unit, and after the information obtaining unit obtains the context information and the action information of the at least one terminal device, the information screening unit is specifically configured to:

obtain, by screening according to a time parameter in each piece of context information, at least two pieces of context information whose time parameter difference is within a preset threshold and at least two pieces of action information corresponding to the at least two pieces of context information; or obtain, by screening according to a time parameter in each piece of context information, at least one piece of context information whose time parameter belongs to a set time interval and at least one piece of action information corresponding to the at least one piece of context information; or obtain, by screening according to location information in each piece of context information, at least one piece of context information corresponding to location information whose location is within a set location area and at least one piece of action information corresponding to the at least one piece of context information.

With reference to the second aspect or any one of the first to the fourth possible implementation manners, in a fifth possible implementation manner, the operation item generating unit is specifically configured to:

generate at least one condition operation item according to the context information, and generate at least one action operation item according to the action information; and after the at least one operation item is generated according to the context information and the action information of the at least one terminal device, the operation item generating unit is further configured to:

determine, according to the action information, an order in which the at least one terminal device is historically operated, sort, according to the order, an identifier representing the at least one terminal device, and associate the sorted identifier of the at least one terminal device with a corresponding condition operation item and action operation item.

With reference to the fourth possible implementation manner, in a fifth possible implementation manner, the at least one condition operation item includes a condition operation item whose condition parameter value is adjustable; the at least one action operation item includes an action operation item whose action parameter value is adjustable.

With reference to the second aspect or any one of the first to the sixth possible implementation manners, in a seventh possible implementation manner, the context information includes at least one of the following: a terminal device identifier, a time parameter, context parameter data, a device home type, or location information.

With reference to the second aspect or any one of the first to the seventh possible implementation manners, in an eighth possible implementation manner, the action information includes at least one of the following: an action name, execution time, execution parameter data, or an execution result.

According to a third aspect, the present disclosure provides a user terminal, where the user terminal includes:

a transceiver, configured to send and receive data;

a memory, configured to store at least one program instruction; and a processor, configured to execute the at least one program instruction, where when executing the at least one program instruction, the processor is specifically configured to:

obtain a creation instruction used to create a context aware application, where the creation instruction includes a creation factor, and the creation factor is entered by a user and/or generated by the user terminal;

determine, according to the creation factor, at least one terminal device related to the creation factor, and obtaining context information and action information of the at least one terminal device;

generate at least one operation item according to the context information and the action information of the at least one terminal device; and generate the context aware application according to the at least one operation item.

With reference to the third aspect, in a first possible implementation manner, the context information and the action information are specifically: information historically recorded or instantly generated.

With reference to the first possible implementation manner, in a second possible implementation manner, when the context information and the action information are stored on the at least one terminal device, the transceiver is specifically configured to:

send a request message to the at least one terminal device; and receive a response message returned by the at least one terminal device, and obtain the historically recorded context information and action information that are stored on the at least one terminal device and that are carried in the response message.

With reference to the third aspect, the first possible implementation manner, or the second possible implementation manner, in a third possible implementation manner, the transceiver is further configured to:

when the creation factor is specifically a context aware application type, determine the at least one terminal device included in the context aware application type; or when the creation factor is specifically a terminal device identifier entered by the user, determine the at least one terminal device related to the identifier; or when the creation factor is specifically area location information entered by the user or generated by the user terminal, determine the at least one terminal device within an area corresponding to the area location information; or when the creation factor is specifically time information generated by the user terminal, determine, based on the time information, the at least one terminal device operated within a preset time interval; or when the creation factor is specifically a start node and an end node on which the user terminal records the context aware application, determine the at least one terminal device between the start node and the end node.

With reference to the third aspect or any one of the first to the third possible implementation manners, in a fourth possible implementation manner, when there are at least two pieces of context information, and after the transceiver obtains the context information and the action information of the at least one terminal device, the processor is specifically configured to:

obtain, by screening according to a time parameter in each piece of context information, at least two pieces of context information whose time parameter difference is within a preset threshold and at least two pieces of action information corresponding to the at least two pieces of context information; or obtain, by screening according to a time parameter in each piece of context information, at least one piece of context information whose time parameter belongs to a set time interval and at least one piece of action information corresponding to the at least one piece of context information; or obtain, by screening according to location information in each piece of context information, at least one piece of context information corresponding to location information whose location is within a set location area and at least one piece of action information corresponding to the at least one piece of context information.

With reference to the third aspect or any one of the first to the fourth possible implementation manners, in a fifth possible implementation manner, the processor is specifically configured to:

generate at least one condition operation item according to the context information, and generate at least one action operation item according to the action information; and after the at least one operation item is generated according to the context information and the action information of the at least one terminal device, the processor is further configured to:

determine, according to the action information, an order in which the at least one terminal device is historically operated, sort, according to the order, an identifier representing the at least one terminal device, and associate the sorted identifier of the at least one terminal device with a corresponding condition operation item and action operation item.

With reference to the fourth possible implementation manner, in a fifth possible implementation manner, the at least one condition operation item includes a condition operation item whose condition parameter value is adjustable; the at least one action operation item includes an action operation item whose action parameter value is adjustable.

With reference to the third aspect or any one of the first to the sixth possible implementation manners, in a seventh possible implementation manner, the context information includes at least one of the following: a terminal device identifier, a time parameter, context parameter data, a device home type, or location information.

With reference to the third aspect or any one of the first to the seventh possible implementation manners, in an eighth possible implementation manner, the action information includes at least one of the following: an action name, execution time, execution parameter data, or an execution result.

The foregoing one or more technical solutions in the embodiments of the present disclosure have at least the following technical effects:

When a creation instruction is obtained, context information and action information of at least one related terminal device are automatically obtained for a user according to a creation factor. After the context information and the action information of the at least one related terminal device are obtained, a corresponding operation item, that is, a condition instruction and an action, is automatically generated, and a context aware application is generated according to the corresponding operation item, so as to reduce work of abstracting, identifying, and compiling an application scenario when the user creates the context aware application, thereby resolving a technical problem in the prior art that development steps of the context aware application are tedious and development efficiency is low, and achieving beneficial effects of simplifying the development steps and improving the development efficiency.

BRIEF DESCRIPTION OF DRAWINGS

To describe the technical solutions in the embodiments of the present disclosure more clearly, the following briefly introduces the accompanying drawings required for describing the embodiments. Apparently, the accompanying drawings in the following description show merely some embodiments of the present disclosure, and persons of ordinary skill in the art may still derive other drawings from these accompanying drawings without creative efforts.

FIG. 7 is a schematic diagram of a mapping between an element and a graph that are in a scene condition and a scene action according to Embodiment 1 of the present disclosure;

DESCRIPTION OF EMBODIMENTS

Figure 1:
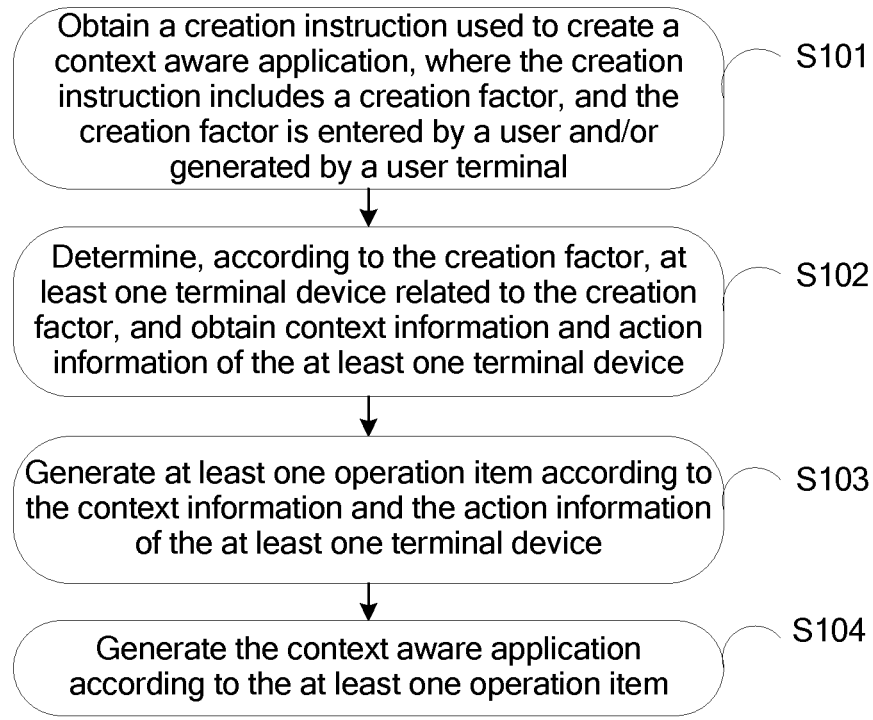
FIG. 1 is a schematic flowchart of a method for creating a context aware application according to Embodiment 1 of the present disclosure.

To resolve a technical problem in the prior art that development steps of a context aware application are tedious and development efficiency is low, embodiments of the present disclosure propose a method for creating a context aware application and a user terminal.

To make the objectives, technical solutions, and advantages of the embodiments of the present disclosure clearer, the following clearly describes the technical solutions in the embodiments of the present disclosure with reference to the accompanying drawings in the embodiments of the present disclosure. Apparently, the described embodiments are some but not all of the embodiments of the present disclosure. All other embodiments obtained by persons of ordinary skill in the art based on the embodiments of the present disclosure without creative efforts shall fall within the protection scope of the present disclosure.

The term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

In the present disclosure, management and an operation are not strictly defined, and the management may be understood as more superordinate description of the operation. In the present disclosure, for consistency of description and ease of understanding, "management" is used in some contexts, and "operation" is used in other contexts. However, in a case in which no difference is clearly defined, the two may be mutually replaced.

In the present disclosure, for ease of characteristic point description, content recoded by a terminal device is classified into context information and action information. However, in most cases, the context information and the action information are not distinguished but recoded as a whole in reality.

In the present disclosure, the context information and the action information may be context information and action information that are stored on the user terminal and/or stored on a server and/or stored on at least one terminal device managed by the user terminal. Different selection and combination may be performed on a storage location of the context information and the action information according to a requirement of a specific embodiment. In addition, the context information and the action information may be information historically recorded and/or instantly generated.

The following describes, with reference to the accompanying drawings, main implementation principles, specific implementation manners, and corresponding accomplishable beneficial effects of the technical solutions in the embodiments of the present disclosure.

Embodiment 1

This embodiment of the present disclosure provides a method for creating a context aware application, where the method is used to manage one or more terminal devices. The context aware application includes a scenario condition constituted of one or more pieces of context information and a scenario action constituted of one or more pieces of action information. When the scenario condition is met, the scenario action is triggered to be executed. Correspondingly, the context information is status data that is of a terminal device at a moment and that is collected by a physical sensor (for example, a temperature sensor or a light sensor) or a virtual sensor (for example, a virtual sensor monitoring a mailbox status by invoking a mailbox interface) in an environment in which a user is located, for example, information such as temperature, noise, and light of the environment in which the user is located and a virtual mood and status. The action information refers to one or more actions executed by a physical device (for example, an air conditioner, a television, and a light) or a virtual device (for example, microblog and a mailbox), for example, "turning on" and "turning off" of the physical device and "sending a mail" of a virtual device mailbox. The action information is used to record an action executed by the terminal device and related information in a process of executing the action. Therefore, management of the one or more terminal devices described in the present disclosure may further be management of an application program or the like installed on the terminal devices.

The method for creating a context aware application provided in the present disclosure may be applied to a context aware system, and may also be applied to a single terminal device. The context aware system provided in the present disclosure may include multiple terminal devices and a server, or may only include multiple terminal devices, where at least one terminal device in the multiple terminal devices includes at least one sensor (a physical sensor and/or a virtual sensor). In the multiple terminal devices, a terminal device that runs the method for creating a context aware application is referred to as a user terminal.

When the context aware system includes the multiple terminal devices and the server, the multiple terminal devices obtain the context information by means of real-time detection by using a sensor, and record and upload the obtained context information to the server. Similarly, when executing an action, the terminal device also records and uploads corresponding action information to the server. The context information and the action information are recorded and uploaded, so that the user terminal may obtain needed context information and action information from the server when creating a context aware application.

When the context aware system includes the multiple terminal devices, each terminal device obtains and records the context information by using the sensor, may locally store the obtained context information, or may upload the obtained context information to the user terminal in the multiple terminal devices. For example, the multiple terminal devices include an electric light, a television, an air conditioner, and a mobile phone, where the mobile phone is the user terminal; then, context information obtained by sensors on the electric light, the television, and the air conditioner and action information obtained when an action is executed may be locally stored, or may be uploaded to the mobile phone.

Referring to FIG. 1, for the foregoing context aware system or terminal device, this embodiment of the present disclosure provides a method for creating a context aware application, where the method includes:

in step S101, obtaining a creation instruction used to create the context aware application, where the creation instruction includes a creation factor, and the creation factor is entered by a user and/or generated by a user terminal;

in step S102, determining, according to the creation factor, at least one terminal device related to the creation factor, and obtaining context information and action information of the at least one terminal device;

in step S103, generating at least one operation item according to the context information and the action information of the at least one terminal device; and in step S104, generating the context aware application according to the at least one operation item.

In a specific implementation process, the creation instruction used to create the context aware application may be triggered by the user according to a need, and the user terminal executing creation of the context aware application executes step S101. The creation factor may be at least one of: a terminal device identifier or area location information entered or selected by the user, and the creation factor may also be at least one of: time information generated by the user terminal or location information generated by the user terminal.

After S101, step S102 of determining, according to the creation factor, at least one terminal device related to the creation factor, and obtaining context information and action information of the at least one terminal device continues to be executed. The context information may include: a terminal device identifier, a time parameter, context parameter data, a device home type, and location information; the action information may include: an action name, execution time, execution parameter data, and an execution result. For different creation factors, specific implementation manners of step S102 are different, including:

(1) The creation factor is specifically a context aware application type.

Specifically, if the creation factor is a context aware application of a type of managing a household device, at least one household device is obtained as the at least one terminal device related to the creation factor; if the creation factor is a context aware application of a type of managing an office device, at least one office device is obtained as the at least one terminal device related to the creation factor.

(2) The creation factor is specifically a terminal device identifier entered by the user.

Specifically, if the creation factor is an identifier that is of an initial terminal device involved in a to-be-created application and that is entered by the user, at least one related device related to the initial terminal device is obtained as the at least one terminal device related to the creation factor. The identifier of the initial terminal device represents a member in the at least one terminal device to be managed after the application is generated. The at least one related device related to the initial terminal device may be at least one intranet device within a local area network in which the initial terminal device is located, or may be a terminal device within a same set geographic area as the initial terminal device. After the at least one terminal device related to the creation factor is obtained, context information and action information that are historically recorded by the at least one terminal device are obtained.

(3) The creation factor is specifically area location information entered by the user.

When the creation factor is specifically the area location information entered by the user, the user terminal determines the at least one terminal device within an area corresponding to the area location information. Specifically, for example, the user selects a kitchen as the creation factor, and then the user terminal determines, according to the area location information, terminal devices such as an electric light and a smoke exhauster that are in the kitchen.

(4) The creation factor is specifically time information generated by the user terminal.

When the creation factor is specifically the time information generated by the user terminal, the at least one terminal device operated within a preset time interval is determined based on the time information. Specifically, for example, the user selects 5:00 as the creation factor, and then the user terminal determines, according to an operation whose historical operation starts from 5:00, the at least one terminal device operated within the preset time interval, for example, a time interval from 4:40 to 5:00.

(5) The creation factor is specifically area location information generated by the user terminal.

When the creation factor is specifically the area location information generated by the user terminal, the user terminal determines the at least one terminal device within an area range of the area location information. Specifically, for example, the user selects, as the creation factor, area location information of a location in which the user is currently located. The area location information is generated by the user terminal, and then the user terminal obtains, by scanning, at least one terminal device within an area range corresponding to the area location information, for example, obtains, by scanning, at least one terminal device within a range of 10 meters away from the location in which the user is currently located, so as to define, by determining the terminal device, a range of subsequently obtaining the context information and the action information.

(6) The creation factor is specifically a terminal device collected by the user terminal.

Specifically, the user terminal may obtain, in a manner such as infrared, two-dimensional code, or Bluetooth, the at least one terminal device related to a context aware application to be created currently.

(7) The creation factor may also be a start node and an end node for recording the context aware application.

Specifically, a start node that is determined by the user and in which the user terminal records the context aware application may be an action start node. For example, a start terminal device specified by the user executes an action to start. Correspondingly, the end node may be an action end node. For example, an end terminal device specified by the user executes an action to end. Further, the start terminal device and the end terminal device may be determined in a manner such as scanning two-dimensional code of the terminal device or infrared matching. For example, it is learned, by scanning the two-dimensional code of the terminal device, that the start terminal device specified by the user is the electric light, and the end terminal device is the air conditioner. Then, in step S102, starting from executing an action of turning on the light by the electric light and before the air conditioner executes an action of turning on the air conditioner, all terminal devices that have executed an action are at least one related terminal device, and then context information and action information that are historically recorded by the at least one terminal device are obtained.

Certainly, the start node may also be start time for recording the context aware application, and correspondingly, the end node is end time for recording the context aware application. In this case, the at least one terminal device related to the creation factor is at least one terminal device that records the context information and/or the action information from the start time to the end time. In step S102, when the context information and the action information that are historically recorded by the at least one terminal device are obtained, context information whose recording time is between the start time and the end time and action information whose execution time is between the start time and the end time may be directly obtained.

Other creation factors that are used to define or construct the context aware application and that are commonly known in the art are also applicable to the present disclosure, and details are not described herein.

To more efficiently use the context information and the action information that are obtained from the terminal device, when there are at least two pieces of obtained context information, a scene filtering policy may further be included in an optional implementation manner. After step S102 is executed, the scene filtering policy may further be executed to further obtain, by screening, the context information and the action information.

The scene filtering policy is specifically one of or a combination of several of the following three manners:

(1) At least two pieces of context information whose time parameter difference is within a preset threshold and at least two pieces of action information corresponding to the at least two pieces of context information are obtained by screening according to a time parameter in each piece of context information. Specifically, at least two pieces of context information whose time interval between time parameters is within the preset threshold and at least two pieces of corresponding action information may be obtained by querying a time parameter in the historically recorded context information and comparing a time interval between time parameters in two pieces of context information.

(2) At least one piece of context information whose time parameter belongs to a set time interval and at least one piece of action information corresponding to the at least one piece of context information are obtained by screening according to a time parameter in each piece of context information. For example, it is assumed that the user clicks a "create" button at 18:00 to start to create the context aware application, and a time interval is set to 18:00-18:10; then, at least one piece of context information whose time parameter is between 18:00 and 18:10 and at least one piece of action information corresponding to the at least one piece of context information are further obtained by screening.

(3) At least one piece of context information corresponding to location information whose location is within a set location area and at least one piece of action information corresponding to the at least one piece of context information are obtained by screening according to location information in each piece of context information.

In a specific implementation process, in addition to the user terminal, the action information and the context information may also be stored on a server or at least one terminal device. The action information and the context information may be stored on the server or the at least one terminal device. The user terminal needs to send a request message to the at least one determined terminal or the server, and then receives a response returned by the at least one terminal device or the server and obtains action information and context information that are stored on at least one electric device and that are carried in the returned response.

After the context information and the action information are obtained by executing step S102, step S103 of generating at least one operation item according to the context information and the action information of the at least one terminal device continues to be executed. Specifically, the context information corresponds to a condition in the context aware application, and the action information corresponds to an execution action of the context aware application; therefore, one condition operation item is generated according to each piece of obtained context information, one action operation item is generated according to each piece of obtained action information, and at least one condition operation item and/or at least one action operation item constitute at least one operation item. For example, one condition operation item "if L=150 cd/m2" is generated according to context information including information "ambient luminance L=150 cd/m2", and one action operation item "open light" is generated according to action information including "turning on a light".

In a specific implementation process, multiple operation items may be generated according to the context information and the action information. Specifically, an order in which the at least one terminal device is operated may be first determined according to the action information. For example, an order of controlling a corresponding terminal device to detect an application condition and execute a corresponding action is determined according to a time parameter in each piece of action information, for example, recording time and execution time, so that an order in which each terminal device in the at least one terminal device is operated is obtained.

Next, an identifier (an identifier of a terminal device may be a character object, or may be an object in an icon form, which is not specially limited herein) representing the at least one terminal device is sorted according to the determined order, and the at least one operation item is generated according to action information, context information, and an identifier that are of each terminal device. Specifically, an order in which the at least one terminal device is historically operated is determined according to the action information, the identifier representing the at least one terminal device is sorted according to the order, and the identifier that is of each terminal device and that is sorted according to the order is associated with a corresponding condition operation item and action operation item.

Further, when there are at least two pieces of action information historically recorded by one terminal device in the at least one terminal device, and in each piece of action information, only an action parameter value is different, for example, execution actions are "open air", an action execution parameter of one piece of action information is that temperature is adjusted to 24 degrees, and an action execution parameter of another piece of action information is that temperature is adjusted to 26 degrees, for each operation item, multiple condition parameter values and multiple action parameter values that may be selected are generated according to multiple pieces of context information and action information that are historically recorded by the terminal device in a same scene, and in an optional manner, the at least one condition operation item is made to include a condition operation item whose condition parameter value is adjustable, and the at least one action operation item is made to include an action operation item whose action parameter value is adjustable. The same scene is determined by using the context information and the corresponding action information of the terminal device. For example, the context information is 6:00 in the afternoon, and the actions are "open air".

After step S103 of generating at least one operation item, step S104 of generating the context aware application according to the at least one operation item is executed. Specifically, when S104 is executed in this embodiment of the present disclosure, the user is allowed to add any operation item or delete or modify any operation item in the at least one operation item. For example, a context value "28" in context information "temperature 28 degrees" is modified to "26", a condition operation item and/or an action operation item thereof are deleted, and when the user saves to create a context aware application, at least one target operation item selected by the user from the at least one operation item is obtained to generate the context aware application. Certainly, when step S104 is executed, the context aware application may also be generated directly according to the at least one generated operation item without user editing (including an operation such as adding, deleting, or modifying).

The following illustrates, by using a complete embodiment, the method for creating a context aware application provided in this embodiment of the present disclosure.

Figure 2:
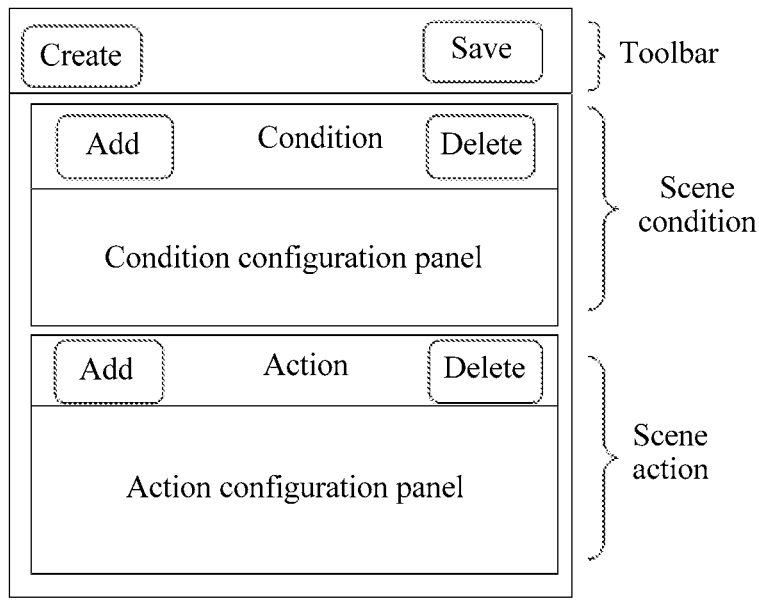
FIG. 2 is a user interface for creating a context aware application according to Embodiment 1 of the present disclosure.

Referring to FIG. 2, this embodiment of the present disclosure provides a user interface for creating a context aware application, including views of a toolbar, a scene condition design area, and a scene action design area. The toolbar defines buttons triggering creating and saving of an application, the scene condition design area includes buttons triggering adding and deleting of a condition and a graphical condition configuration panel, and the scene action design area includes buttons triggering adding and deleting of an action and a graphical action configuration panel.

Figure 3:
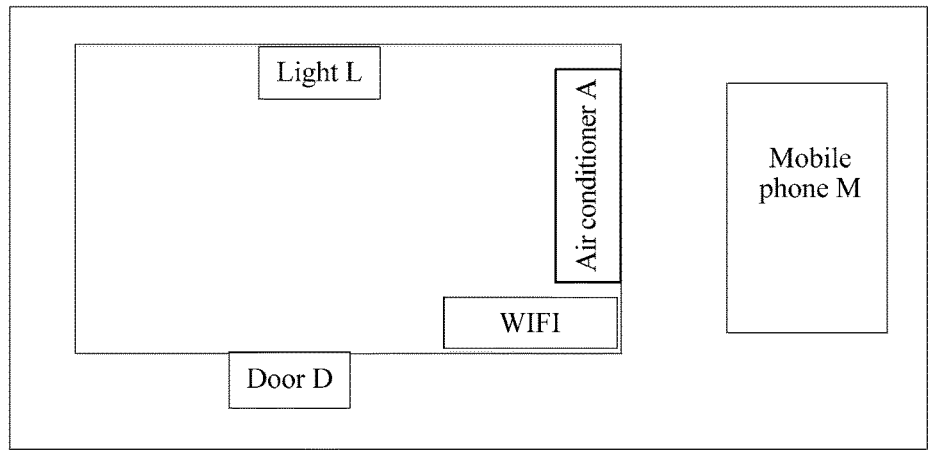
FIG. 3 is a schematic diagram of a terminal device in a household application scenario according to Embodiment 1 of the present disclosure.

Referring to FIG. 3, a living room in a house of a user U includes the following terminal devices: a light L, an air conditioner A, a door D, and WiFi named home. A corresponding sensor is integrated in each terminal device. For example, a light sensor is integrated in the light L, a temperature sensor is integrated in the air conditioner A, and an opening/closing sensor is integrated in the door D. A CA_DE (Context Aware Development Environment, context aware development environment) used to create a context aware application is integrated in a mobile phone M of the user U.

In an actual application process, action information when a status of a terminal device changes, and status data, when the status changes, of each terminal device or of an environment in which the each terminal device is located, are context information, and are obtained by collection by using a sensor of the each terminal device in the living room. The obtained context information is reported to a CA_PLT (Context Aware Platform, context aware platform), where the CA_PLT may be locally disposed on each terminal device, or may be disposed on a household manager, or may be disposed on the mobile phone M. The following gives further description by using an example in which the CA_PLT is disposed on the mobile phone M.

Figure 4:
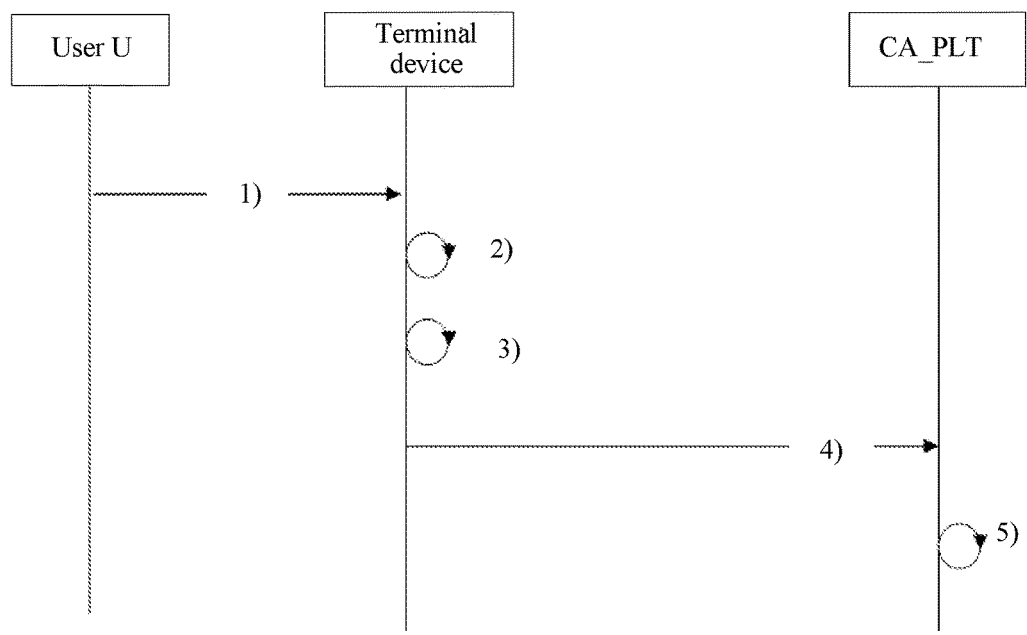
FIG. 4 is a schematic diagram of a process of obtaining action information according to Embodiment 1 of the present disclosure.

The user U manually does the following things when returning home from work in the evening: 1. opening the door D in the house to enter the living room; 2. then, turning on the light L in the living room; 3. next, turning on the air conditioner A in the living room and setting temperature to 26 degrees. Referring to FIG. 4, a process in which the terminal device reports the action information is as follows:

(1) The user U completes three action instructions: opening the door D, turning on the light L in the living room, and turning on the air conditioner A in the living room after arriving home.

(2) After receiving the action instructions, three devices, that is, the terminal devices of the door D, the light L in the living room, and the air conditioner A execute the action instructions to successively open the door D, turn on the light L in the living room, and turn on the air conditioner A and set the temperature to 26 degrees.

(3) The action information is recorded in a process in which each terminal device executes the action instructions, where the action information may include: an action name, execution time, an execution result, execution parameter data, an execution device identifier, and a user account. For example, action information recorded by the air conditioner A may be shown in Table 1:

TABLE 1

| Action Name | Execution Time | Execution Result | Execution Parameter Data | Execution Device Identifier | User Account |
|---|---|---|---|---|---|
| open air-condition | 18:30 | open | 26° C. | air.png | test |

(4) Each terminal device reports the recorded action information to the context aware platform CA_PLT.

(5) The context aware platform CA_PLT receives and stores the reported action information.

Figure 5:
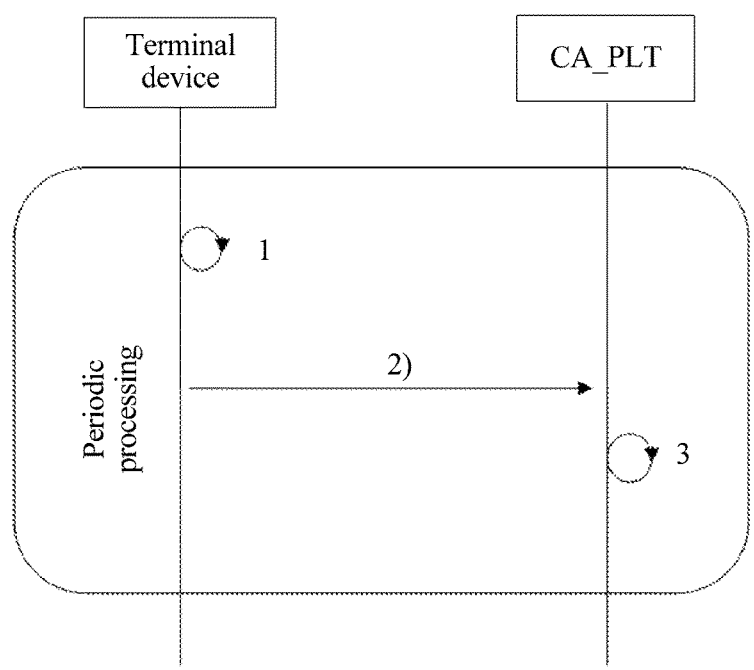
FIG. 5 is a schematic diagram of a process of obtaining context information according to Embodiment 1 of the present disclosure.

When reporting the action information, each terminal device also reports context information before or after executing an action. Referring to FIG. 5, a specific process in which the context information is reported is as follows:

(1) Each terminal device periodically collects and records, by using the sensor, status data of the terminal device or status data of an environment in which the terminal device is located, that is, obtains the context information. The context information may include: a context name, a context value, recording time, a recording device identifier, a recording location, and a user account. For example, context information recorded by the air conditioner A may be shown in Table 2:

TABLE 2

| Context Name | Recording Time | Context Value | Recording Location (GPS) | Recording Device Identifier | User Account |
|---|---|---|---|---|---|
| open air-condition | 18:27 | 31° C. | (122.00, 5456.55) | air.png | test |

(2) Each terminal device reports the collected and recorded context information to the context aware platform CA_PLT.

(3) The context aware platform CA_PLT receives and stores the reported context information.

Particularly, when a sensor is not integrated in a terminal device A, this embodiment of the present disclosure provides a method for obtaining context information and action information: Context information of an environment in which the terminal device B is located is recorded by collection by using a sensor in another terminal device B, and an action executed by the terminal device A and action information in the environment are obtained by speculation according to a change of the context information. For example, context information of an environment, that is, the living room in which the mobile phone M is located is obtained by using a light sensor of the mobile phone M, and an action that occurs in another terminal device is obtained by analyzing historical context information. It is assumed that a value of light intensity in the context information currently collected by the mobile phone M is much greater than a value of light intensity in historical context information collected last time, it can be determined that the user U turns on the light L in the living room. Further, it is inferred that the light L executes an action of turning on the light, and corresponding action information is obtained.

Figure 6:
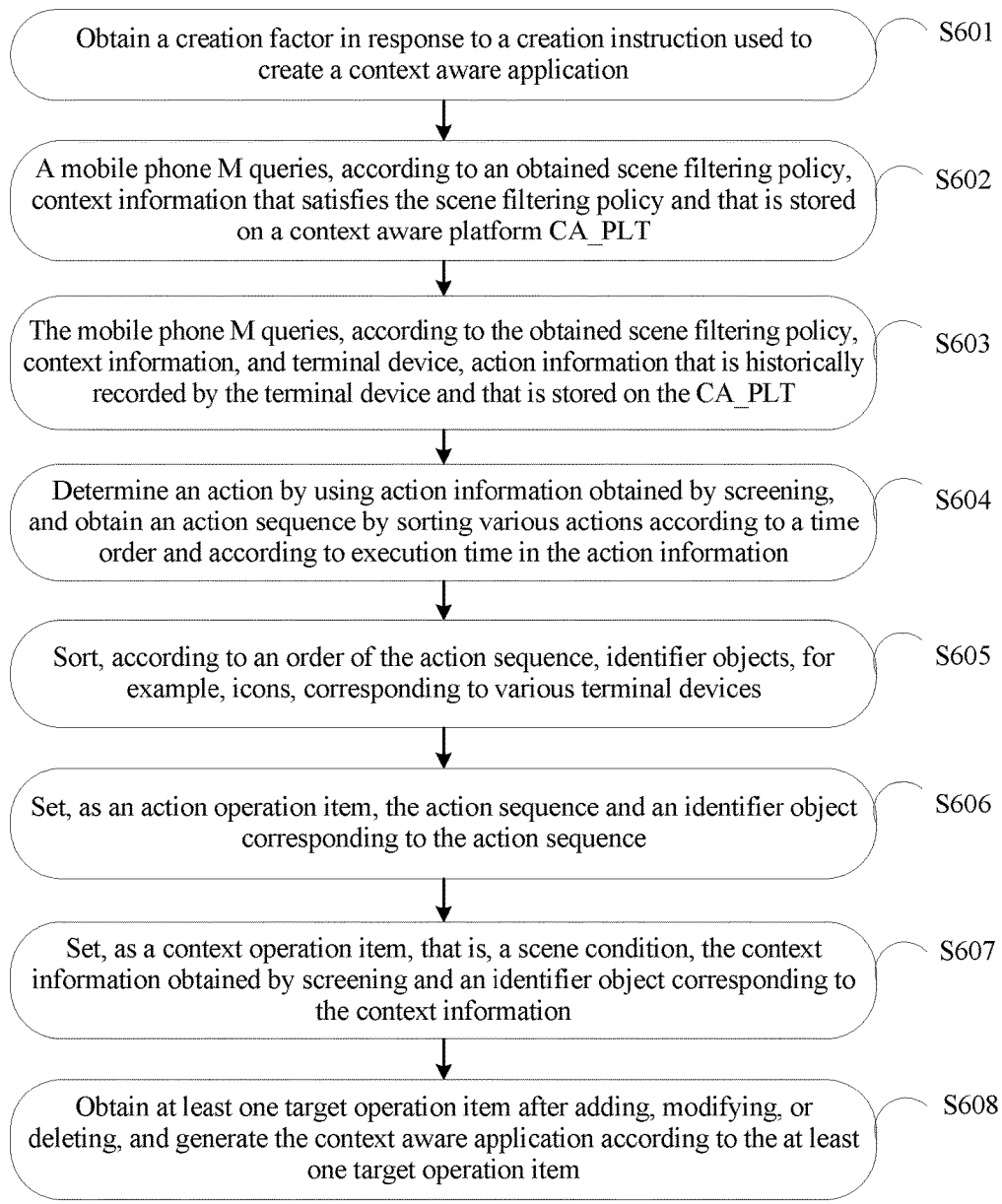
FIG. 6 is a schematic diagram of a process of creating a household aware application according to Embodiment 1 of the present disclosure.

Referring to FIG. 6, after each terminal device reports the context information and the action information to the context aware platform, the user may click a "create" button on a user interface provided by the CA_DE, to trigger the mobile phone M to generate a creation instruction and execute the following creation process:

In step S601, a creation factor is obtained in response to a creation instruction used to create a context aware application. It is assumed that the creation factor herein is a scene filtering policy, and the mobile phone M reads a default scene filtering policy of a system or a scene filtering policy preconfigured by the user U. Certainly, the user U may also be requested to configure a scene policy. For example, a scene filtering policy S that is configured by the user U and is requested to be obtained is "in a mobile phone network, context information and action information executed within five minutes before a current moment ends".

In step S602, the mobile phone M queries, according to an obtained scene filtering policy, context information that satisfies the scene filtering policy and that is stored on the context aware platform CA_PLT.

First, the mobile phone M may parse the scene filtering policy S "in a mobile phone network, context information and action information executed within five minutes before a current moment ends", and determine that a context of the scene filtering policy S is classified as a mobile phone network mobilenet. Context entity set data stored on the context aware platform CA_PLT is shown in Table 3:

TABLE 3

| Type | Name | Icon | Property | PropertyType |
|---|---|---|---|---|
| mobilenet | wifi | wifi.png | bssid | string |
| acceleration | Acceleration | acc.png | xpseed | int |
| acceleration | Acceleration | acc.png | yspeed | int |
| . . . | . . . | . . . | . . . | . . . |

Then, a user unique identifier of the mobile phone M, for example, test, location data, for example, (GPS: 122.00, 5456.55), and a current moment, for example, 2014-3-3 18:30 are obtained by querying, and a context query condition is then generated with reference to "within five minutes before a current moment ends" in the scene filtering policy, and is shown in Table 4:

TABLE 4

| Name | Property | Value | Time | User | GPS |
|---|---|---|---|---|---|
| wifi | bssid | home | 2014-3-3 18:25-18:30 | test | (122.00, 5456.55) |

Next, context information satisfying the condition and a terminal device corresponding to the context information satisfying the condition, for example, the light L, the air conditioner A, and the door D, are queried according to the context query condition.

In step S603, the mobile phone M queries, according to the obtained scene filtering policy, context information, and terminal device, action information that is historically recorded by the terminal device and that is stored on the context aware platform CA_PLT. Specifically, an action query condition is generated by using a principle the same as that of generating the context query condition. Further, action information that is within a set time length and whose execution time is after recording time of the context information may also be further defined in the action query condition.

In step S604, an action is determined by using action information obtained by screening, and an action sequence is obtained by sorting various actions according to a time order and according to execution time in the action information.

In step S605, identifiers corresponding to various terminal devices, for example, icons, are sorted according to the action sequence, that is, an order in which the terminal devices are executed.

In step S606, the action sequence and an identifier corresponding to the action sequence are set as an action operation item, that is, a scene action. Each action in the action operation item corresponds to an identifier of a terminal device executing the action.

In step S607, the context information obtained by screening and an identifier corresponding to the context information are set as a context operation item, that is, a scene condition. Each context in the context operation item corresponds to an identifier of a terminal device executing check of the context.

In step S608, at least one target operation item after adding, modifying, or deleting is obtained, and the context aware application is generated according to the at least one target operation item. For example, if a scene condition in the target operation item is: after a moment 18:20, ambient light intensity is less than 150 cd/m2, and ambient temperature is greater than 28° C., and a scene action is: turning on the light L, and then turning on the air conditioner A and setting cryogenic temperature to 26° C., the mobile phone M generates the context aware application to detect the scene condition, and executes a corresponding scene action when detecting that the scene condition is satisfied. It should be noted that according to the method for creating a context aware application provided in this embodiment of the present disclosure, the context aware application may be generated according to the at least one target operation item, and a context aware application template may further be generated according to the at least one target operation item.

In a specific implementation process, according to the method for creating a context aware application provided in this embodiment of the present disclosure, when the at least one operation item is generated, a scene may further be rendered to generate a graphical operation item based on the context information, the action information, and a mapping model defined by a scene condition/scene action graphical mapping, and the user is requested, in a graphical manner, to further customize a scene condition model and a scene action model of a graphical application model, and the scene condition model and the scene action model are updated according to customization information of the user.

The mapping model defined by the scene condition/scene action graphical mapping is as follows:

Mapping is performed between elements (a context, an attribute, a value operator "=, !=, >, <, or the like", an attribute value, a logical operation "AND, OR, or the like", an action, and a parameter) constituting the context aware application and graphical elements of a jigsaw. A mapping relationship is shown in FIG. 7, and a vivid and intuitive graphical application scene is formed by using a jigsaw of graphical elements.

Figure 8:
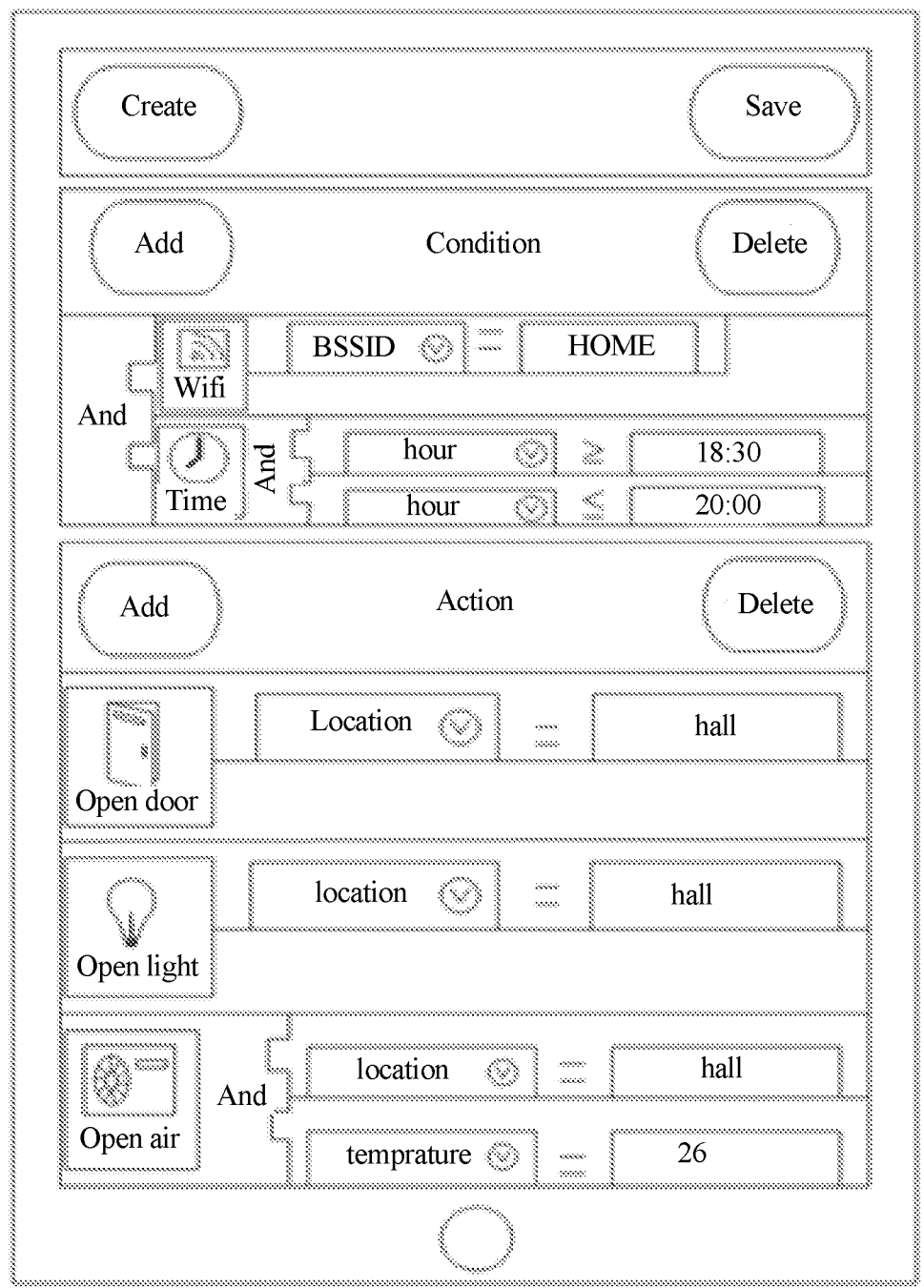
FIG. 8 is a schematic diagram of a graphical operation item according to Embodiment 1 of the present disclosure.

Referring to FIG. 8, a context graphical element and an action graphical element are generated according to a scene condition and scene action model and a mapping relationship between an element and a graph that are in the model. The context graphical element is generated according to a context mapping graph, a context name, and an identifier icon, a context value operation expression is generated according to an expression mapping graph, a context attribute name, a value operator, and an attribute value, the action graphical element is generated according to an action mapping graph, an action name, and an identifier icon, and an action parameter expression is generated according to an action parameter expression mapping graph, a parameter name, a value operator, and parameter data. A more complex scene condition and scene action may be flexibly organized by using an AND or OR graphical element.

It should be noted that the at least one operation item generated in this embodiment of the present disclosure is not limited to being presented in a graphical manner. Presentation manners that may be figured out by persons of ordinary skill in the art, for example, a manner of being presented by using a character, a command, or the like all fall within the protection scope of the present disclosure.

Embodiment 2

Figure 9:
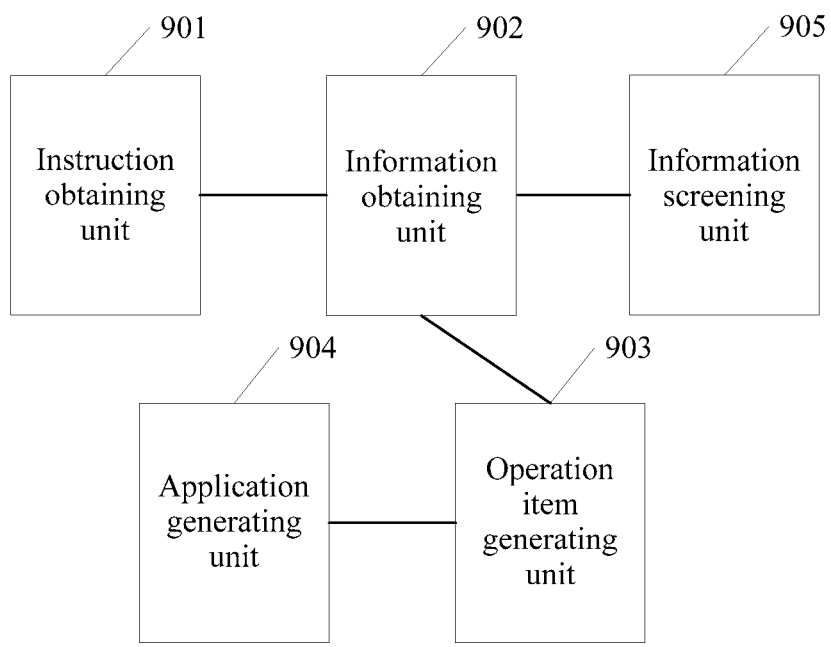
FIG. 9 is a schematic structural diagram of a user terminal according to Embodiment 2 of the present disclosure.

Referring to FIG. 9, this embodiment of the present disclosure provides a user terminal, where the user terminal includes:

an instruction obtaining unit 901, configured to obtain a creation instruction used to create a context aware application, where the creation instruction includes a creation factor, and the creation factor is entered by a user and/or generated by the user terminal;

an information obtaining unit 902, configured to: determine, according to the creation factor, at least one terminal device related to the creation factor, and obtain context information and action information of the at least one terminal device;

an operation item generating unit 903, configured to generate at least one operation item according to the context information and the action information of the at least one terminal device; and an application generating unit 904, configured to generate the context aware application according to the at least one operation item.

In a specific implementation process, the context information and the action information are specifically: information historically recorded or instantly generated. The context information and the action information may be specifically stored on a server, the user terminal having an application creation function, or each terminal device. When the context information and the action information are stored on the at least one terminal device, the information obtaining unit 902 is specifically configured to: send a request message to the at least one terminal device; and receive a response message returned by the at least one terminal device, and obtain the historically recorded context information and action information that are stored on the at least one terminal device and that are carried in the response message.

The information obtaining unit provided in this embodiment of the present disclosure may first determine a related terminal device according to different creation factors, and further obtain context information and action information of the related terminal device. Specifically, the information obtaining unit 902 is further configured to: when the creation factor is specifically a context aware application type, determine the at least one terminal device included in the context aware application type; or when the creation factor is specifically a terminal device identifier entered by the user, determine the at least one terminal device related to the identifier; or when the creation factor is specifically area location information entered by the user or generated by the user terminal, determine the at least one terminal device within an area corresponding to the area location information; or when the creation factor is specifically time information generated by the user terminal, determine, based on the time information, the at least one terminal device operated within a preset time interval; or when the creation factor is specifically a start node and an end node on which the user terminal records the context aware application, determine the at least one terminal device between the start node and the end node.

In a specific implementation process, to further increase utilization rates of the context information and the action information, when there are at least two pieces of context information, the user terminal further provides an information screening unit 905, and after the information obtaining unit 902 obtains the context information and the action information of the at least one terminal device, the information screening unit 905 is specifically configured to: obtain, by screening according to a time parameter in each piece of context information of the at least two pieces of context information, at least two pieces of context information whose time parameter difference is within a preset threshold and at least two pieces of action information corresponding to the at least two pieces of context information; or the information screening unit 905 is specifically configured to: obtain, by screening according to a time parameter in each piece of context information, at least one piece of context information whose time parameter belongs to a set time interval and at least one piece of action information corresponding to the at least one piece of context information; or the information screening unit 905 is specifically configured to: obtain, by screening according to location information in each piece of context information, at least one piece of context information corresponding to location information whose location is within a set location area and at least one piece of action information corresponding to the at least one piece of context information.

In a specific implementation process, the operation item generating unit 903 is specifically configured to: generate at least one condition operation item according to the context information, and generate at least one action operation item according to the action information; and after the at least one operation item is generated according to the context information and the action information of the at least one terminal device, the operation item generating unit 903 is further configured to: determine, according to the action information, an order in which the at least one terminal device is historically operated, sort, according to the order, an identifier representing the at least one terminal device, and associate the sorted identifier of the at least one terminal device with a corresponding condition operation item and action operation item.

In a specific implementation process, to provide a more flexible application creation manner for the user, the at least one condition operation item provided in this embodiment of the present disclosure includes a condition operation item whose condition parameter value is adjustable; the at least one action operation item includes an action operation item whose action parameter value is adjustable.

In a specific implementation process, the context information includes at least one of the following: a terminal device identifier, a time parameter, context parameter data, a device home type, or location information. The action information includes at least one of the following: an action name, execution time, execution parameter data, or an execution result. Specific information items included in the foregoing context information and action information may be selected by persons of ordinary skill in the art according to an actual need. For example, the creation factor in the context aware application is location area selection, and then the context information needs to include location information for detecting the context information; a screening condition is screening context information within a preset time interval, and then the context information needs to include a time parameter for detecting the context information, and so on.

Various types of variations and specific instances of the method of a context aware application provided in the foregoing embodiments in FIG. 1 to FIG. 8 are also applicable to the user terminal in this embodiment. According to the foregoing detailed description of the method of a context aware application, persons skilled in the art may clearly understand an implementation method of the user terminal in this embodiment. Therefore, for brevity of the specification, details are not described herein again.

Embodiment 3

Figure 10:
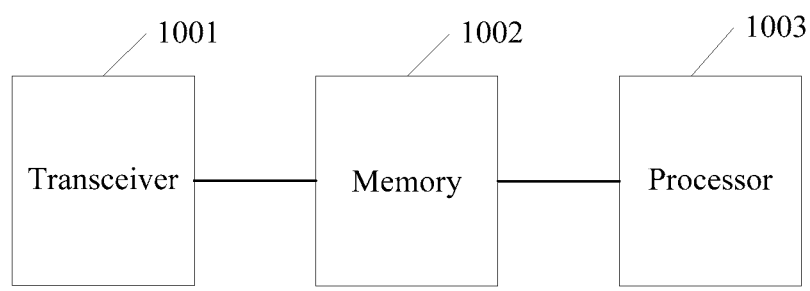
FIG. 10 is a schematic structural diagram of a user terminal according to Embodiment 3 of the present disclosure.

Referring to FIG. 10, this embodiment of the present disclosure provides a user terminal, where the user terminal includes:

a transceiver 1001, configured to send and receive data;

a memory 1002, configured to store at least one program instruction; and a processor 1003, configured to execute the at least one program instruction, where when executing the at least one program instruction, the processor is specifically configured to:

obtain a creation instruction used to create a context aware application, where the creation instruction includes a creation factor, and the creation factor is entered by a user and/or generated by the user terminal;

determine, according to the creation factor, at least one terminal device related to the creation factor, and obtaining context information and action information of the at least one terminal device;

generate at least one operation item according to the context information and the action information of the at least one terminal device; and generate the context aware application according to the at least one operation item.

In a specific implementation process, the context information and the action information are specifically: information historically recorded or instantly generated. The context information and the action information may be specifically stored on a server, the user terminal having an application creation function, or each terminal device. When the context information and the action information are stored on the at least one terminal device, the processor 1003 is specifically configured to: send a request message to the at least one terminal device by using the transceiver 1001; and receive, by using the transceiver 1001, a response message returned by the at least one terminal device, and obtain the historically recorded context information and action information that are stored on the at least one terminal device and that are carried in the response message.

The information obtaining unit provided in this embodiment of the present disclosure may first determine a related terminal device according to different creation factors, and further obtain context information and action information of the related terminal device. Specifically, the processor 1003 is further configured to: when the creation factor is specifically a context aware application type, determine the at least one terminal device included in the context aware application type; or when the creation factor is specifically a terminal device identifier entered by the user, determine the at least one terminal device related to the identifier; or when the creation factor is specifically area location information entered by the user or generated by the user terminal, determine the at least one terminal device within an area corresponding to the area location information; or when the creation factor is specifically time information generated by the user terminal, determine, based on the time information, the at least one terminal device operated within a preset time interval; or when the creation factor is specifically a start node and an end node on which the user terminal records the context aware application, determine the at least one terminal device between the start node and the end node.

In a specific implementation process, to further increase utilization rates of the context information and the action information, when there are at least two pieces of context information, the processor 1003 provided by the user terminal is further configured to: after the context information and the action information of the at least one terminal device are obtained, obtain, by screening according to a time parameter in each piece of context information of the at least two pieces of context information, at least two pieces of context information whose time parameter difference is within a preset threshold and at least two pieces of action information corresponding to the at least two pieces of context information; or the processor 1003 is further configured to: obtain, by screening according to a time parameter in each piece of context information, at least one piece of context information whose time parameter belongs to a set time interval and at least one piece of action information corresponding to the at least one piece of context information; or the processor 1003 is further configured to: obtain, by screening according to location information in each piece of context information, at least one piece of context information corresponding to location information whose location is within a set location area and at least one piece of action information corresponding to the at least one piece of context information.

In a specific implementation process, the processor 1003 is further configured to: generate at least one condition operation item according to the context information, and generate at least one action operation item according to the action information; and after the at least one operation item is generated according to the context information and the action information of the at least one terminal device, the processor 1003 is further configured to: determine, according to the action information, an order in which the at least one terminal device is historically operated, sort, according to the order, an identifier representing the at least one terminal device, and associate the sorted identifier of the at least one terminal device with a corresponding condition operation item and action operation item.

In a specific implementation process, to provide a more flexible application creation manner for the user, the at least one condition operation item provided in this embodiment of the present disclosure includes a condition operation item whose condition parameter value is adjustable; the at least one action operation item includes an action operation item whose action parameter value is adjustable.

In a specific implementation process, the context information includes at least one of the following: a terminal device identifier, a time parameter, context parameter data, a device home type, or location information. The action information includes at least one of the following: an action name, execution time, execution parameter data, or an execution result. Specific information items included in the foregoing context information and action information may be selected by persons of ordinary skill in the art according to an actual need. For example, the creation factor in the context aware application is location area selection, and then the context information needs to include location information for detecting the context information; a screening condition is screening context information within a preset time interval, and then the context information needs to include a time parameter for detecting the context information, and so on.

Various types of variations and specific instances of the method of a context aware application provided in the foregoing embodiments in FIG. 1 to FIG. 8 are also applicable to the user terminal in this embodiment. According to the foregoing detailed description of the method of a context aware application, persons skilled in the art may clearly understand an implementation method of the user terminal in this embodiment. Therefore, for brevity of the specification, details are not described herein again.

The following technical effects may be implemented by using one or more technical solutions in the embodiments of the present disclosure:

When a creation instruction is obtained, context information and action information of at least one related terminal device are automatically obtained for a user according to a creation factor. After the context information and the action information of the at least one related terminal device are obtained, a corresponding operation item, that is, a condition instruction and an action, is automatically generated, and a context aware application is generated according to the corresponding operation item, so as to reduce work of abstracting, identifying, and compiling an application scenario when the user creates the context aware application, thereby resolving a technical problem in the prior art that development steps of the context aware application are tedious and development efficiency is low, and achieving beneficial effects of simplifying the development steps and improving the development efficiency.

Persons skilled in the art should understand that the embodiments of the present disclosure may be provided as a method, a system, or a computer program product. Therefore, the present disclosure may use a form of hardware only embodiments, software only embodiments, or embodiments with a combination of software and hardware. Moreover, the present disclosure may use a form of a computer program product that is implemented on one or more computer-usable storage media (including but not limited to a disk memory, a CD-ROM, an optical memory, and the like) that include computer-usable program code.

The present disclosure is described with reference to the flowcharts and/or block diagrams of the method, the device (system), and the computer program product according to the embodiments of the present disclosure. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may also be stored on a computer readable memory that can instruct the computer or any other programmable data processing device to work in a specific manner, so that the instructions stored on the computer readable memory generate an artifact that includes an instruction apparatus. The instruction apparatus implements a specific function in one or more processes in the flowcharts and/or in one or more blocks in the block diagrams.

These computer program instructions may also be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

Obviously, persons skilled in the art can make various modifications and variations to the present disclosure without departing from the spirit and scope of the present disclosure. The present disclosure is intended to cover these modifications and variations provided that they fall within the scope of protection defined by the following claims and their equivalent technologies.

What is claimed is:

1. A method for creating a context aware application for operating a plurality of terminal devices, the method comprising:
    obtaining a creation instruction used to create the context aware application, wherein the creation instruction comprises a plurality of terminal device identifiers, each terminal device identifier corresponding to a one of the plurality of terminal devices;
    determining, based on the plurality of terminal device identifiers, the plurality of terminal devices, where each one of the plurality of terminal devices is associated with a corresponding one of the terminal device identifiers;
    obtaining for each one of the plurality of terminal devices, a context information and an action information stored on the ones of the plurality of terminal devices for instances of action instructions executed on the respective ones of the plurality of terminal devices, wherein each instance of executing an action instruction on one of the plurality of terminal devices results in the respective terminal device storing corresponding:
        action information that identifies the executed action instruction, wherein corresponding action, and
        context information comprising status data collected at the respective terminal device shortly before or after executing the instance of the action instruction;
    generating a plurality of operation items, wherein each operation item corresponds to one of the action instructions executed on the respective ones of the plurality of terminal devices, and wherein each operation item comprises:
        an action operation item generated according to the action information for the executed action instruction, and
        a condition operation item generated according to context information;
    determining, after the generating the plurality of operation items, a sequential time order for the plurality of operation items corresponding to the instances of action instructions executed on the respective ones of the terminal devices;
    generating, according to the sequential time order, a time-sequence sorted plurality of displayable identifier objects, where each one of the displayable identifier objects represents an instruction execution instance corresponding to one of the plurality of operation items executed on a respective one of the plurality of terminal devices; and
    generating, after generating a time-sequence sorted plurality of displayable identifier objects, the context aware application according to the plurality of operation items and the time-sequence sorted plurality of displayable identifier objects.

2. The method according to claim 1, wherein the context information and the action information are: information historically recorded or instantly generated.

3. The method according to claim 2, wherein the obtaining the context information and the action information comprises:
    sending a request message to respective ones of the plurality of terminal devices; and
    receiving a response message returned by the respective ones of the plurality of terminal devices, and obtaining the historically recorded context information and action information that are stored on the respective ones of the plurality of terminal devices and that are carried in the response message.

4. The method according to claim 1, wherein after the obtaining context information and action information of the plurality of terminal devices, the method further comprises:
    obtaining, by screening according to a time parameter in each piece of context information, at least two pieces of context information whose time parameter difference is within a preset threshold and at least two pieces of action information corresponding to the at least two pieces of context information.

5. The method according to claim 1, wherein the condition operation item for one of the plurality of action items comprises a condition parameter value that is adjustable; and the action operation item comprises an action parameter value that is adjustable.

6. The method according to claim 1, wherein the context information comprises at least one of the following:
    a terminal device identifier, a time parameter, context parameter data, a device home type, or location information.

7. The method according to claim 1, wherein the action information comprises at least one of the following:
    an action name, execution time, execution parameter data, or an execution result.

8. The method according to claim 1, wherein after the obtaining context information and action information of the plurality of terminal devices, the method further comprises:
obtaining, by screening according to a time parameter in each piece of context information, at least one piece of context information whose time parameter belongs to a set time interval and at least one piece of action information corresponding to the at least one piece of context information.

9. The method according to claim 1, wherein after the obtaining context information and action information of the plurality of terminal devices, the method further comprises:
obtaining, by screening according to location information in each piece of context information, at least one piece of context information corresponding to location information whose location is within a set location area and at least one piece of action information corresponding to the at least one piece of context information.

10. A user terminal, comprising:
a transceiver, configured to send and receive data;
a memory, configured to store at least one program instruction; and
a processor, configured to execute the at least one program instruction, which instructs the processor to carry out a method comprising:
obtaining a creation instruction used to create a context aware application, wherein the creation instruction comprises a plurality of terminal device identifiers, each terminal device identifier corresponding to a one of a plurality of terminal devices;
determining, based on the plurality of terminal device identifiers, the plurality of terminal devices, where each one of the plurality of terminal devices is associated with a corresponding one of the terminal device identifiers;
obtaining for each one of the plurality of terminal devices, a context information and an action information stored on the ones of the plurality of terminal devices for instances of action instructions executed on the respective ones of the plurality of terminal devices, wherein each instance of executing an action instruction on one of the plurality of terminal devices results in the respective terminal device storing corresponding:
action information that identifies the executed action instruction, wherein corresponding action, and
context information comprising status data collected at the respective terminal device shortly before or after executing the instance of the action instruction;
generating a plurality of operation items, wherein each operation item corresponds to one of the action instructions executed on the respective ones of the plurality of terminal devices, and wherein each operation item comprises:
an action operation item generated according to the action information for the executed action instruction, and
a condition operation item generated according to context information;
determining, after the generating the plurality of operation items, a sequential time order for the plurality of operation items corresponding to the instances of action instructions executed on the respective ones of the terminal devices;
generating, according to the sequential time order, a time-sequence sorted plurality of displayable identifier objects, where each one of the displayable identifier objects represents an instruction execution instance corresponding to one of the plurality of operation items executed on a respective one of the plurality of terminal devices; and
generating, after generating a time-sequence sorted plurality of displayable identifier objects, the context aware application according to the plurality of operation items and the time-sequence sorted plurality of displayable identifier objects.

11. The user terminal according to claim 10, wherein the context information and the action information are: information historically recorded or instantly generated.

12. The user terminal according to claim 11, wherein the transceiver is configured to:
send a request message to respective ones of the plurality of terminal devices; and
receive a response message returned by the respective ones of the plurality of terminal devices, and obtain the historically recorded context information and action information that are stored on the respective ones of the plurality of terminal devices and that are carried in the response message.

13. The user terminal according to claim 10, wherein after the transceiver obtains the context information and the action information of the at least one terminal device, the processor is configured to:
obtain, by screening according to a time parameter in each piece of context information, at least two pieces of context information whose time parameter difference is within a preset threshold and at least two pieces of action information corresponding to the at least two pieces of context information.

14. The user terminal according to claim 10, wherein the condition operation item for one of the plurality of action items comprises a condition parameter value that is adjustable; and the action operation item comprises an action parameter value that is adjustable.

15. The user terminal according to claim 10, wherein the context information comprises at least one of the following:
a terminal device identifier, a time parameter, context parameter data, a device home type, or location information.

16. The user terminal according to claim 10, wherein the action information comprises at least one of the following:
an action name, execution time, execution parameter data, or an execution result.

17. The user terminal according to claim 10, wherein after the transceiver obtains the context information and the action information of the at least one terminal device, the processor is configured to:
obtain, by screening according to a time parameter in each piece of context information, at least one piece of context information whose time parameter belongs to a set time interval and at least one piece of action information corresponding to the at least one piece of context information.

18. The user terminal according to claim 10, wherein after the transceiver obtains the context information and the action information of the at least one terminal device, the processor is configured to:
obtain, by screening according to location information in each piece of context information, at least one piece of context information corresponding to location information whose location is within a set location area and at least one piece of action information corresponding to the at least one piece of context information.

19. A non-transitory computer readable medium, comprising processor-executable instructions which when executed causes a processor to implement operations of a method including:

obtaining a creation instruction used to create a context aware application, wherein the creation instruction comprises a plurality of terminal device identifiers, each terminal device identifier corresponding to a one of a plurality of terminal devices;

determining, based on the plurality of terminal device identifiers, the plurality of terminal devices, where each one of the plurality of terminal devices is associated with a corresponding one of the terminal device identifiers;

obtaining for each one of the plurality of terminal devices, a context information and an action information stored on the ones of the plurality of terminal devices for instances of action instructions executed on the respective ones of the plurality of terminal devices, wherein each instance of executing an action instruction on one of the plurality of terminal devices results in the respective terminal device storing corresponding:

action information that identifies the executed action instruction, wherein corresponding action, and context information comprising status data collected at the respective terminal device shortly before or after executing the instance of the action instruction;

generating a plurality of operation items, wherein each operation item corresponds to one of the action instructions executed on the respective ones of the plurality of terminal devices, and wherein each operation item comprises:

an action operation item generated according to the action information for the executed action instruction, and a condition operation item generated according to context information;

determining, after the generating the plurality of operation items, a sequential time order for the plurality of operation items corresponding to the instances of action instructions executed on the respective ones of the terminal devices;

generating, according to the sequential time order, a time-sequence sorted plurality of displayable identifier objects, where each one of the displayable identifier objects represents an instruction execution instance corresponding to one of the plurality of operation items executed on a respective one of the plurality of terminal devices; and generating, after generating a time-sequence sorted plurality of displayable identifier objects, the context aware application according to the plurality of operation items and the time-sequence sorted plurality of displayable identifier objects.

20. The non-transitory computer readable medium according to claim 19, wherein the context information and the action information are: information historically recorded or instantly generated.

* * * * *